(12) United States Patent
Nagabhushanrao et al.

(10) Patent No.: US 11,575,276 B2
(45) Date of Patent: *Feb. 7, 2023

(54) SYSTEMS AND METHODS FOR OPERATING A POWER DEVICE

(71) Applicant: SCHNEIDER ELECTRIC IT CORPORATION, Foxboro, MA (US)

(72) Inventors: Pradeep Tolakanahalli Nagabhushanrao, Bangalore (IN); Pavan Kumar Gudipalli, Bangalore (IN); Nagaraju Ingurthi, Bangalore (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,098

(22) Filed: Feb. 15, 2022

(65) Prior Publication Data

US 2022/0239143 A1 Jul. 28, 2022

Related U.S. Application Data

(63) Continuation of application No. 17/111,231, filed on Dec. 3, 2020, now Pat. No. 11,283,285.

(60) Provisional application No. 62/950,315, filed on Dec. 19, 2019.

(51) Int. Cl.
*H02J 9/00* (2006.01)
*H02J 9/06* (2006.01)
*H02M 3/155* (2006.01)

(52) U.S. Cl.
CPC ............. *H02J 9/061* (2013.01); *H02M 3/155* (2013.01)

(58) Field of Classification Search
CPC ............. H02J 9/062; H02J 9/06; H02M 3/155
See application file for complete search history.

(56) References Cited

U.S. PATENT DOCUMENTS

| | | |
|---|---|---|
| 4,860,185 A | 8/1989 | Brewer et al. |
| 5,315,533 A | 5/1994 | Stich et al. |
| 5,923,099 A | 7/1999 | Bilir |
| 7,939,968 B2 * | 5/2011 | Hjort ........................ H02J 9/062 307/64 |
| 8,310,094 B2 | 11/2012 | Yamada et al. |
| 8,552,589 B2 | 10/2013 | Ghosh et al. |

(Continued)

OTHER PUBLICATIONS

Extended European Search Report from corresponding European Application No. 20214033.1 dated Jun. 8, 2021.

*Primary Examiner* — Jared Fureman
*Assistant Examiner* — Esayas G Yeshaw
(74) *Attorney, Agent, or Firm* — Lando & Anastasi, LLP (57) ABSTRACT

Examples of the disclosure include an uninterruptible power supply comprising an input configured to be coupled to a power source, an output configured to output power to a load, a main controller, a main logic power supply, an auxiliary logic power supply, and an auxiliary controller configured to receive power from the auxiliary logic power supply, the auxiliary controller being configured to receive a signal indicating that the load is not powered by the uninterruptible power supply, output a first signal to initiate shutdown of the main controller and the main logic power supply, and output a second signal to power-up the main controller and the main logic power supply after a predetermined period of time elapses after outputting the first signal.

20 Claims, 8 Drawing Sheets

(56) References Cited

U.S. PATENT DOCUMENTS

| | | |
|---|---|---|
| 8,896,152 B2 | 11/2014 | Beg et al. |
| 10,879,727 B1 | 12/2020 | Cooper |
| 2006/0221523 A1 | 10/2006 | Colombi et al. |
| 2007/0200434 A1 | 8/2007 | Gottlieb et al. |
| 2010/0125384 A1 | 5/2010 | Wyatt et al. |
| 2013/0002024 A1 | 1/2013 | Beg et al. |
| 2013/0020863 A1 | 1/2013 | Sugiyama et al. |
| 2016/0134160 A1 | 5/2016 | Schultz et al. |
| 2016/0207403 A1 | 7/2016 | Iida et al. |
| 2018/0159343 A1 | 6/2018 | Chen et al. |
| 2019/0067987 A1* | 2/2019 | Tsai .................... G01R 19/165 |
| 2019/0305583 A1* | 10/2019 | Tanaka ................ H04B 5/0062 |
| 2020/0122584 A1* | 4/2020 | Zhang .................. B60W 10/30 |

* cited by examiner

SYSTEMS AND METHODS FOR OPERATING A POWER DEVICE

CROSS-REFERENCE TO RELATED APPLICATIONS

This application is a Continuation of U.S. application Ser. No. 17/111,231, titled SYSTEMS AND METHODS FOR OPERATING A POWER DEVICE, filed on Dec. 3, 2020, which claims priority under 35 U.S.C. § 119(e) to U.S. Provisional Application Ser. No. 62/950,315, titled SYSTEMS AND METHODS FOR OPERATING AN UNINTERRUPTIBLE POWER SUPPLY IN A LOW-ENERGY MAINTENANCE MODE, filed on Dec. 19, 2019, both of which are hereby incorporated herein by reference in their entirety for all purposes.

BACKGROUND

1. Field of the Disclosure

At least one example in accordance with the present disclosure relates generally to operating power devices.

2. Discussion of Related Art

Power devices, such as Uninterruptible Power Supplies (UPSs), may provide regulated, uninterrupted power for sensitive and/or critical loads, such as computer systems and other data processing systems. A UPS may provide direct current power and/or alternating current power to a load connected to the UPS. If the load is disconnected from the UPS, the UPS may discontinue providing power to the load.

SUMMARY

According to at least one aspect of the present disclosure an uninterruptible power supply is provided comprising an input configured to be coupled to a power source, an output configured to output power to a load, a main controller, a main logic power supply, an auxiliary logic power supply, and an auxiliary controller configured to receive power from the auxiliary logic power supply, the auxiliary controller being configured to receive a signal indicating that the load is not powered by the uninterruptible power supply, output a first signal to initiate shutdown of the main controller and the main logic power supply, and output a second signal to power-up the main controller and the main logic power supply after a predetermined period of time elapses after outputting the first signal.

In various examples, the uninterruptible power supply further comprises a communication interface, wherein the main controller is configured to receive an away-mode signal from the communication interface. In some examples, the uninterruptible power supply further comprises a battery charger configured to charge a battery, wherein the main controller is further configured to control the battery charger to provide power from the input to the battery responsive to determining that the battery is not sufficiently charged and responsive to receiving the away-mode signal. In at least one example, determining that the battery is not sufficiently charged includes determining, by the main controller, that the battery is below a threshold level of charge. In various examples, the threshold level of charge is about 95% of a maximum capacity of the battery.

In some examples, the uninterruptible power supply further comprises a DC/DC converter, and wherein the main controller is further configured to control the DC/DC converter to shut down responsive to receiving the away-mode signal. In at least one example, the uninterruptible power supply further comprises a battery charger configured to charge a battery, wherein the main controller is configured to provide a third signal to the auxiliary controller responsive to determining that the battery is sufficiently charged and responsive to receiving the away-mode signal. In various examples, the auxiliary controller is configured to provide the first signal to the main controller responsive to receiving the third signal from the main controller. In some examples, determining that the battery is sufficiently charged includes determining that the battery is above a threshold level of charge. In at least one example, the threshold level of charge is about 95% of a maximum capacity of the battery.

In various examples, the uninterruptible power supply further comprises a battery charger configured to charge a battery, wherein the main controller is configured to receive the second signal from the auxiliary controller, and determine if the battery is sufficiently charged responsive to receiving the second signal. In at least one example, the main controller is configured to provide a third signal to the auxiliary controller responsive to determining that the battery is sufficiently charged, the auxiliary controller is configured to provide a fourth signal to the main controller responsive to receiving the third signal, and the main controller is configured to shut down responsive to receiving the fourth signal. In various examples, the main controller is configured to control the battery charger to provide power from the input to the battery responsive to determining that the battery is not sufficiently charged.

In at least one example, the main controller is configured to control the main logic power supply to shut down responsive to receiving the first signal from the auxiliary controller. In various examples, the auxiliary controller is configured to output the second signal to the main logic power supply to power-up the main logic power supply. In some examples, the auxiliary logic power supply is configured to receive power from the input, and provide power to the auxiliary controller using the power from the input. In at least one example, the auxiliary logic power supply is configured to provide power to the main logic power supply using the power from the input. In various examples, the auxiliary logic power supply is configured to provide power to the main logic power supply after the predetermined period of time elapses after outputting the first signal.

According to at least one aspect of the disclosure, a non-transitory computer-readable medium storing thereon sequences of computer-executable instructions for controlling an uninterruptible power supply configured to provide power to a load is provided, the uninterruptible power supply comprising a main controller and a main logic power supply configured to provide power to the main controller, the sequences of computer-executable instructions including instructions that instruct at least one processor to receive a signal indicating that the load is not powered by the uninterruptible power supply, output a first signal to initiate shutdown of the main controller and the main logic power supply, and output a second signal to power-up the main controller and the main logic power supply after a predetermined period of time elapses after outputting the first signal.

In at least one example, the uninterruptible power supply includes a battery interface configured to be coupled to a battery, and wherein the instructions further instruct the at least one processor to receive a third signal from the main controller indicating the battery is sufficiently charged, and provide the first signal to the main controller responsive to receiving the third signal.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, uninterruptible power supplies (UPSs) may provide direct current (DC) power and/or alternating current (AC) power to a load. Certain loads may be configured to receive AC power, DC power, or a combination of both. For example, a load may include a first input to receive AC power from a UPS and a second input to receive DC power from a UPS.

Figure 1:
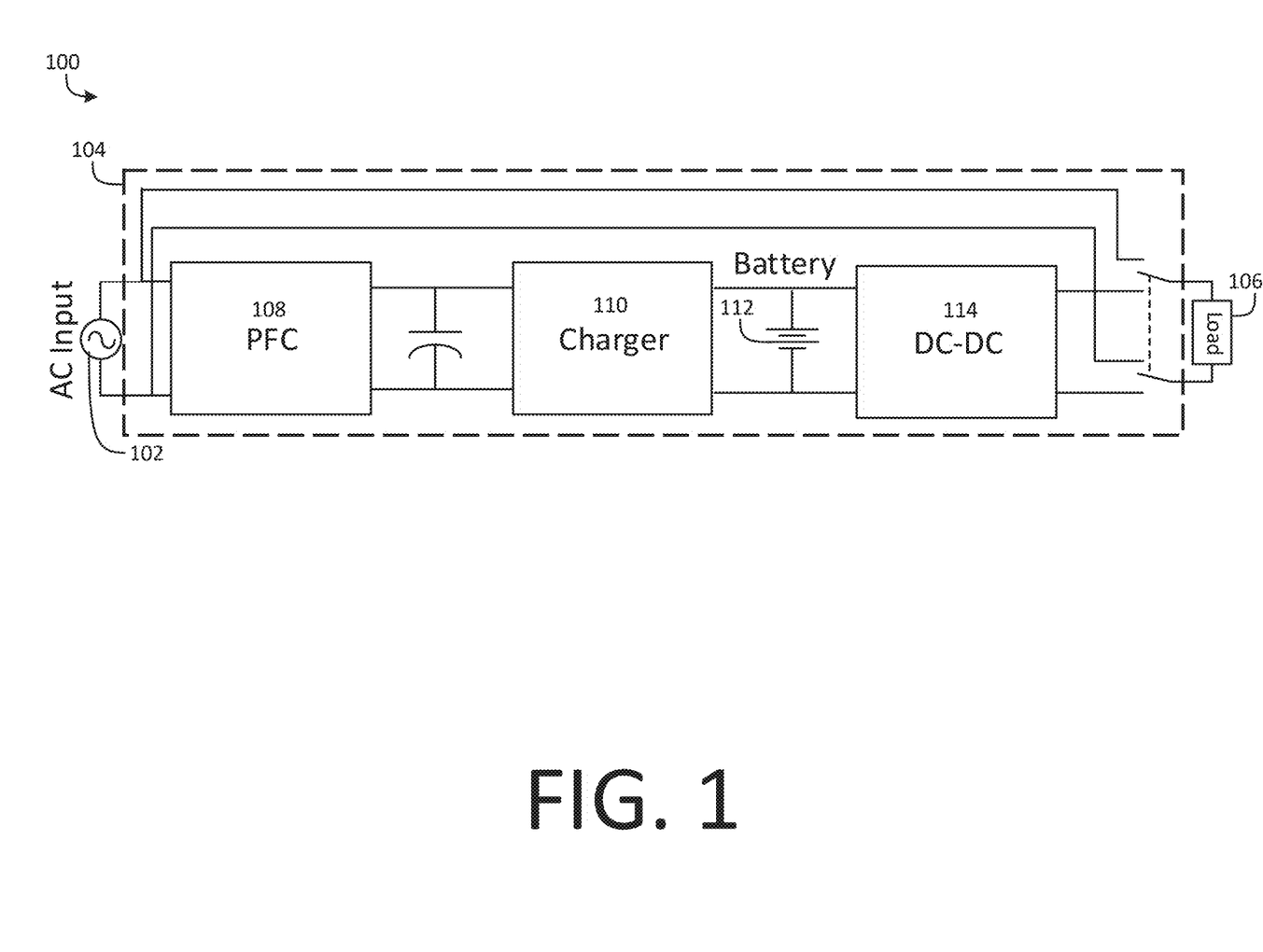
FIG. 1 illustrates a block diagram of a power system according to an example.

FIG. 1 illustrates a block diagram of a power system 100. The power system 100 includes an AC power source 102, a UPS 104, and a load 106. The UPS 104 includes a power factor correction (PFC) component 108, a charger 110, a battery 112, and a DC/DC converter 114. It is to be appreciated that the power system 100 and/or the UPS 104 may include additional, fewer, or different components, and that the illustrated components are provided for purposes of explanation.

The AC power source 102 is configured to provide AC power to the PFC component 108 and/or the load 106. The AC power source 102 may include, for example, a utility power source configured to provide grid power to the power system 100. A quality of the AC power provided by the AC power source 102 may vary over time. For example, the AC power may have a lower quality where a voltage level of the AC power deviates significantly from a rated AC voltage level as compared to AC power having a voltage level that does not deviate significantly from a rated AC voltage level.

In various examples, the load 106 may be switchably connected to the AC power source 102 via the UPS 104. The UPS 104 may provide AC power from the AC power source 102 if the quality of the AC power is acceptable (for example, by having an AC voltage level that is within an acceptable range of values). The load 106 may also be switchably connected to the UPS 104 via the DC/DC converter 114. The UPS 104 may provide DC power to the load 106 via the DC/DC converter 114 if the quality of the AC power is not acceptable (for example, by having an AC voltage level that is not within an acceptable range of values).

The UPS 104 may charge the battery 112 using power derived from AC power received AC power source 102. For example, the PFC component 108 may receive AC power from the AC power source 102 and provide power-factor correction to the AC power. The PFC component 108 may provide the power-factor-corrected power to the charger 110. The charger 110 may receive the power-factor-corrected power and charge the battery 112. In various examples, the charger 110 may charge the battery 112 if the battery 112 is below a threshold level of charge (for example, about 95% of a full-charge level). If the battery 112 is above the threshold level of charge, the charger 110 may not charge the battery 112.

If the UPS 104 is to provide DC power to the load 106, then the battery 112 may provide DC power to the DC/DC converter 114. The DC/DC converter 114 may convert the received DC power to converted DC power, and provide the converted DC power to the load 106. As discussed above, in some examples the UPS 104 may provide DC power to the load 106 where the AC power is not acceptable.

Accordingly, the power system 100 enables AC power to be provided to the load 106 from the AC power source 102 where acceptable AC power is available, and enables DC power to be provided to the load 106 where acceptable AC power is not available. In some examples, DC power may be provided to the load 106 even where acceptable AC power is available. In still other examples, the UPS 104 may include a DC/AC inverter in addition to, or in lieu of, the DC/DC converter 114, and the UPS 104 may provide AC power to the load 106 derived from the battery 112 in addition to, or in lieu of, DC power.

At various points in time, the load 106 may not draw power from the UPS 104. For example, the load 106 may be controlled to enter an off mode in which the load 106 is not operational, and thus does not draw power, or may be disconnected from the UPS 104. The UPS 104 may continue to consume power even where the load 106 does not draw power, however. For example, the UPS 104 may include one or more internal logic components, which may consume power even where the load 106 does not draw power.

Examples disclosed herein provide an energy-efficient power device, such as an energy-efficient UPS that can provide power to a load. When the power device is not providing power to a load (for example, because the load is in an off mode, or is disconnected from the power device), the power device may enter an "away mode." In the away mode, the power device may turn off one or more components of the power device or otherwise control the one or more components to enter a lower-power state. The power device may continue to perform certain operations in the away mode, such as charging a battery if the battery meets a charging condition. For example, the charging condition may include a charge level of the battery being below a specified charge threshold.

If the battery does not meet the charging condition, then the power device may not charge the battery. The power device may control additional components of the power device to shutdown or enter a lower-power state responsive to determining that the battery does not meet the charging condition. The power device may remain in this low-power state while monitoring the battery to determine if the battery meets the charging condition. For example, the power device may awaken components of the power device after a threshold period of time elapses, determine whether the battery meets the charging condition, and either charge the battery if the charging condition is met or control the components of the power device to return to the low-power state if the charging condition is not met. Accordingly, examples provided herein enable a reduction in power consumption by a power device.

Current back-up power systems, such as uninterruptible power supplies, may maintain certain components in an active state while a load connected to the power system is in an away mode. Such modular power systems may operate inefficiently, because certain active components may be consuming power but may not be actively performing a function that the component is configured to perform because the load is not actively drawing power. This is a technical problem. An exemplary embodiment of a power system may comprise an uninterruptible power supply comprising an input configured to be coupled to a power source, an output configured to output power to a load, a main controller, a main logic power supply, an auxiliary logic power supply, and an auxiliary controller configured to receive power from the auxiliary logic power supply, the auxiliary controller being configured to receive a signal indicating that the load is not powered by the uninterruptible power supply, output a first signal to initiate shutdown of the main controller and the main logic power supply, and output a second signal to power-up the main controller and the main logic power supply after a predetermined period of time elapses after outputting the first signal.

At least this foregoing combination of features comprises a power system that serves as a technical solution to the foregoing technical problem. This technical solution is not routine and is unconventional. This technical solution is a practical application of the power system design that solves the foregoing technical problem and constitutes an improvement in the technical field of power supply design at least by increasing an efficiency of a power supply system.

Figure 2:
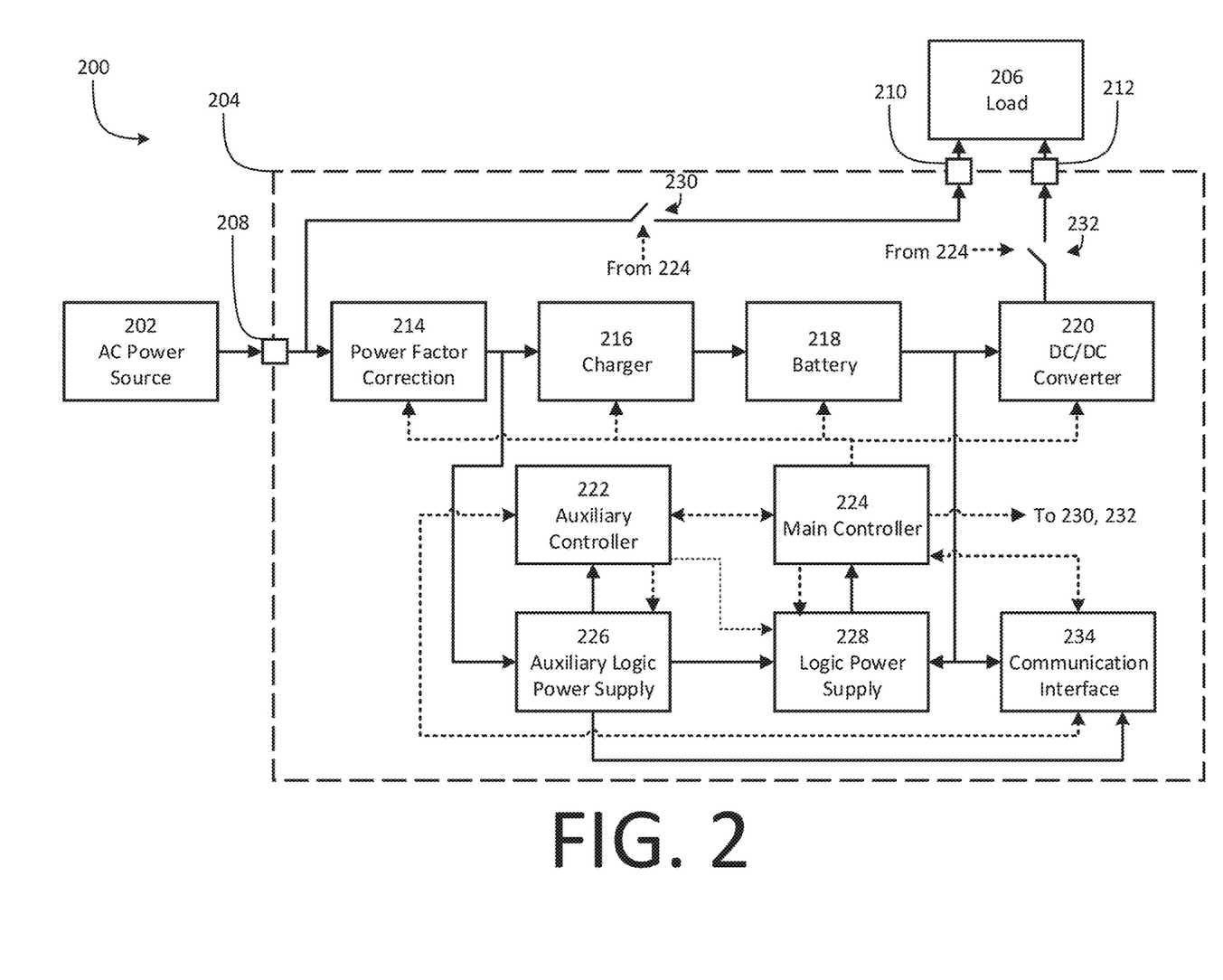
FIG. 2 illustrates a block diagram of a power system according to another example.

FIG. 2 illustrates a block diagram of a power system 200 according to an example. The power system 200 includes an AC power source 202, a UPS 204, and a load 206. The UPS 204 includes an input 208, an AC output 210, a DC output 212, a PFC circuit 214, a charger 216, a battery 218, a DC/DC converter 220, an auxiliary controller 222, a main controller 224, an auxiliary logic power supply (ALPS) 226, a logic power supply (LPS) 228, an AC output switch 230, a DC output switch 232, and a communication interface 234. It is to be appreciated that the power system 200 and/or the UPS 204 may include additional, fewer, or different components, and that the illustrated components are provided for purposes of explanation. For example, in some embodiments, the AC output switch 230 may be omitted such that the input 208 is directly connected to the AC output 210.

The AC power source 202 is configured to be coupled to, and to provide AC power to, the input 208. The load 206 is coupled to, and is configured to receive power from, the AC output 210 and the DC output 212. As discussed in greater detail below, the load 206 may draw power from the AC output 210 when acceptable AC power is available to the UPS 204, and may draw power from the DC output 212 when acceptable AC power is not available to the UPS 204.

The input 208 is coupled to the PFC circuit 214 and the AC output switch 230, and is configured to be coupled to, and receive AC power from, the AC power source 202. The PFC circuit 214 is coupled to the input 208, the charger 216, and the ALPS 226, and is communicatively coupled to the main controller 224. The PFC circuit 214 is configured to receive AC power from the AC power source 202 via the input 208, provide power factor correction to the received AC power, and provide DC power to the charger 216 and the ALPS 226. The charger 216 is coupled to the PFC circuit 214 and the battery 218, and is communicatively coupled to the main controller 224. The charger 216 is configured to receive the DC power from the PFC circuit 214 and provide charging power derived from the DC power to the battery 218. The battery 218 is coupled to the charger 216, the DC/DC converter 220, the LPS 228, and the communication interface 234, and is communicatively coupled to the main controller 224. The battery 218 is configured to receive the charging power from the charger 216, store the charging power, and provide stored DC power to the DC/DC converter 220, the LPS 228, and the communication interface 234.

The DC/DC converter 220 is coupled to the battery 218 and the DC output switch 232, and is communicatively coupled to the main controller 224. The DC/DC converter 220 is configured to receive stored power from the battery 218, convert the stored power to converted DC power, and provide the converted DC power to the DC output switch 232. The auxiliary controller 222 is coupled to the ALPS 226 and is communicatively coupled to the main controller 224, the ALPS 226, the LPS 228, and the communication interface 234. The auxiliary controller 222 is configured to control operation of the main controller 224, the ALPS 226, and the LPS 228.

The main controller 224 is coupled to the LPS 228 and is communicatively coupled to the PFC circuit 214, the charger 216, the battery 218, the DC/DC converter 220, the auxiliary controller 222, the LPS 228, and the communication interface 234. The main controller 224 is configured to control and/or communicate with the components to which the main controller 224 is communicatively coupled. The ALPS 226 is coupled to the PFC circuit 214, the auxiliary controller 222, the LPS 228, the communication interface 234, and is communicatively coupled to the auxiliary controller 222. The ALPS 226 is configured to receive input power from the PFC circuit 214 and provide output power to the auxiliary controller 222, the LPS 228, and the communication interface 234. The LPS 228 is coupled to the main controller 224, the ALPS 226, the LPS 228, and the battery 218, and is communicatively coupled to the main controller 224. The LPS 228 is configured to receive input power from the battery 218 and the ALPS 226, and to provide output power to the main controller 224. The communication interface 234 is coupled to the battery 218 and the ALPS 226, and is communicatively coupled to the auxiliary controller 222 and the main controller 224. The communication interface 234 may include one or more wired or wireless communication interfaces, such as one or more antennas, communication ports, and so forth, and may include one or more user interface components, such as one or more buttons, switches, potentiometers, displays (including touch-sensitive and non-touch-sensitive displays), keyboards, mice, and so forth, to interact with a user.

The UPS 204 is configured to operate in one of several modes of operation, including a mains mode of operation, a battery mode of operation, and an away mode of operation. The away mode of operation further includes a charging mode of operation and a low-power mode of operation. In each mode of operation, certain components may be in an off or low-power state. As discussed in greater detail below, the UPS 204 may enter the away mode in response to an input received from a user to enter the away mode. The UPS may consume less power in the away mode, such that efficiency may be increased by implementing the UPS 204 with the away mode. For example, the user may instruct the UPS 204 to enter the away mode because the load 206 is not drawing power, and may not draw power for an extended period of time, such that the UPS 204 can enter a lower-power state while output power is not drawn by the load 206. It is to be appreciated that, in other examples, the UPS 204 may enter the away mode in response to criteria other than, or in addition to, receiving a communication from a user.

Figure 3:
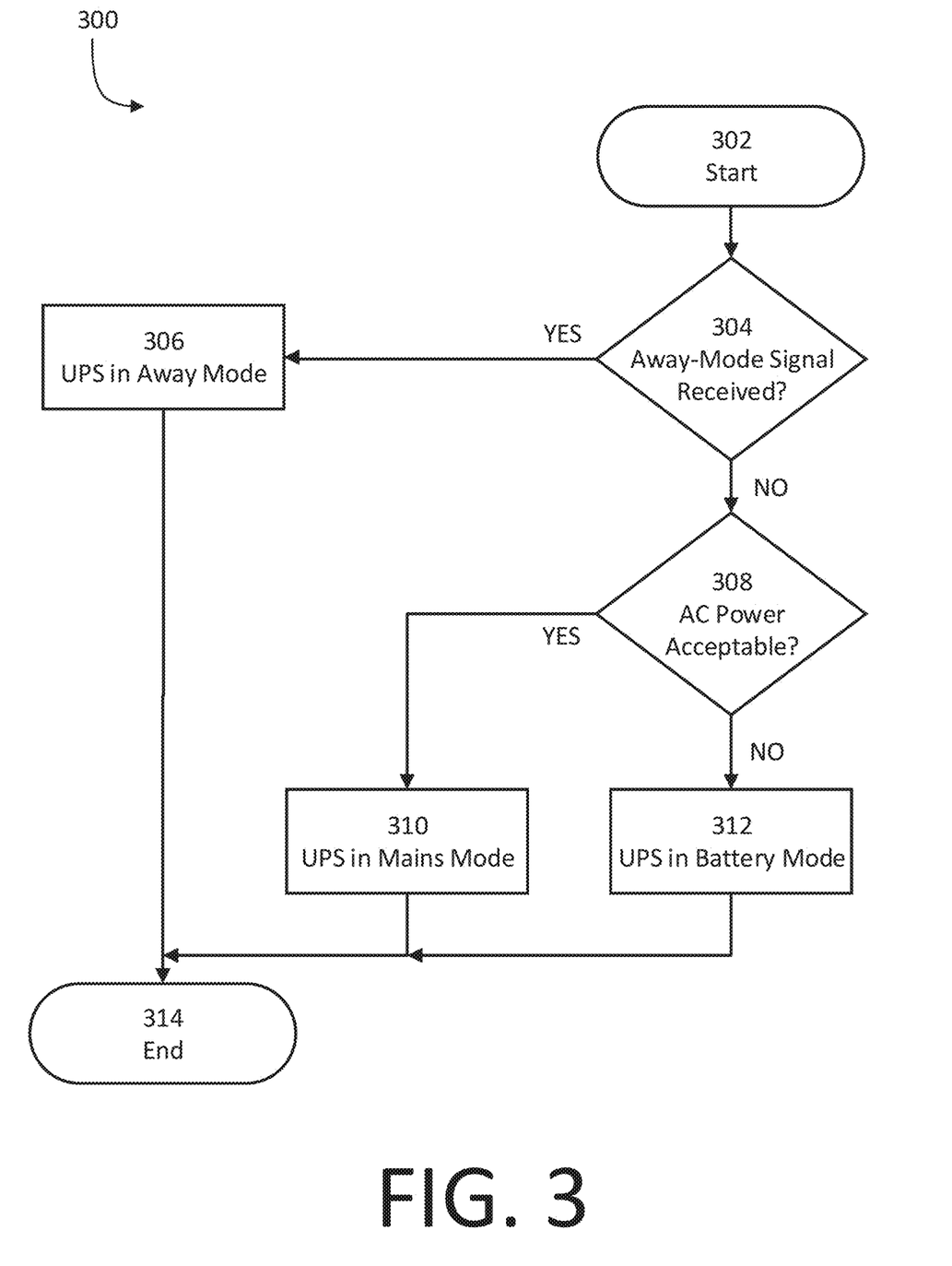
FIG. 3 illustrates a process of controlling a power device to select a mode of operation according to an example.

FIG. 3 illustrates a process 300 of controlling a power device to select a mode of operation according to an example. For example, the process 300 may be executed by the UPS 204 to select a mode of operation of the UPS 204.

At act 302, the process 300 begins.

At act 304, a determination is made as to whether an away-mode signal has been received by the UPS 204. The communication interface 234 may send the away-mode signal to the main controller 224 and/or the auxiliary controller 222. For example, the communication interface 234 may send the away-mode signal to the main controller 224 and/or the auxiliary controller 222 in response to an input from a user. In another example, the communication interface 234 may send the away-mode signal to the main controller 224 and the main controller 224 may send a signal indicative of the away-mode signal to the auxiliary controller 222.

In one example, the input from the user may include a user pressing a button on the communication interface 234, flipping a switch on the communication interface 234, turning a potentiometer on the communication interface 234, selecting an option on a display on the communication interface 234, and so forth. In another example, the communication interface 234 may receive a wired or wireless communication from a user to enter the away mode. In still other examples, the away-mode signal may be received from a component other than the communication interface 234. If a determination is made that an away-mode signal has not been received (304 NO), then the process 300 continues to act 308. Otherwise, if a determination is made that an away-mode signal has been received (304 YES), then the process 300 continues to act 306.

At act 306, the UPS 204 is controlled to be in the away mode. The away mode may include two modes of operation, including a charging mode of operation and a low-power mode of operation. An example of act 306 is provided below with respect to FIG. 6. The process 300 continues to act 314. At act 314, the process 300 ends.

Returning to act 304, if the away-mode signal is not received (304 NO), then the process 300 continues to act 308. At act 308, a determination is made as to whether AC power received at the input 208 from the AC power source 202 is acceptable. The determination may be made by the main controller 224. As discussed above, the AC power may be considered acceptable if electrical parameters of the AC power (for example, a voltage level, a current, a phase, and so forth) are within acceptable ranges. For example, the AC power may be considered acceptable if the AC power is rated at 120 V, and the voltage level of the AC power is within 118-122 V. If the AC power is acceptable (308 YES), then the process 300 continues to act 310.

Figure 4:
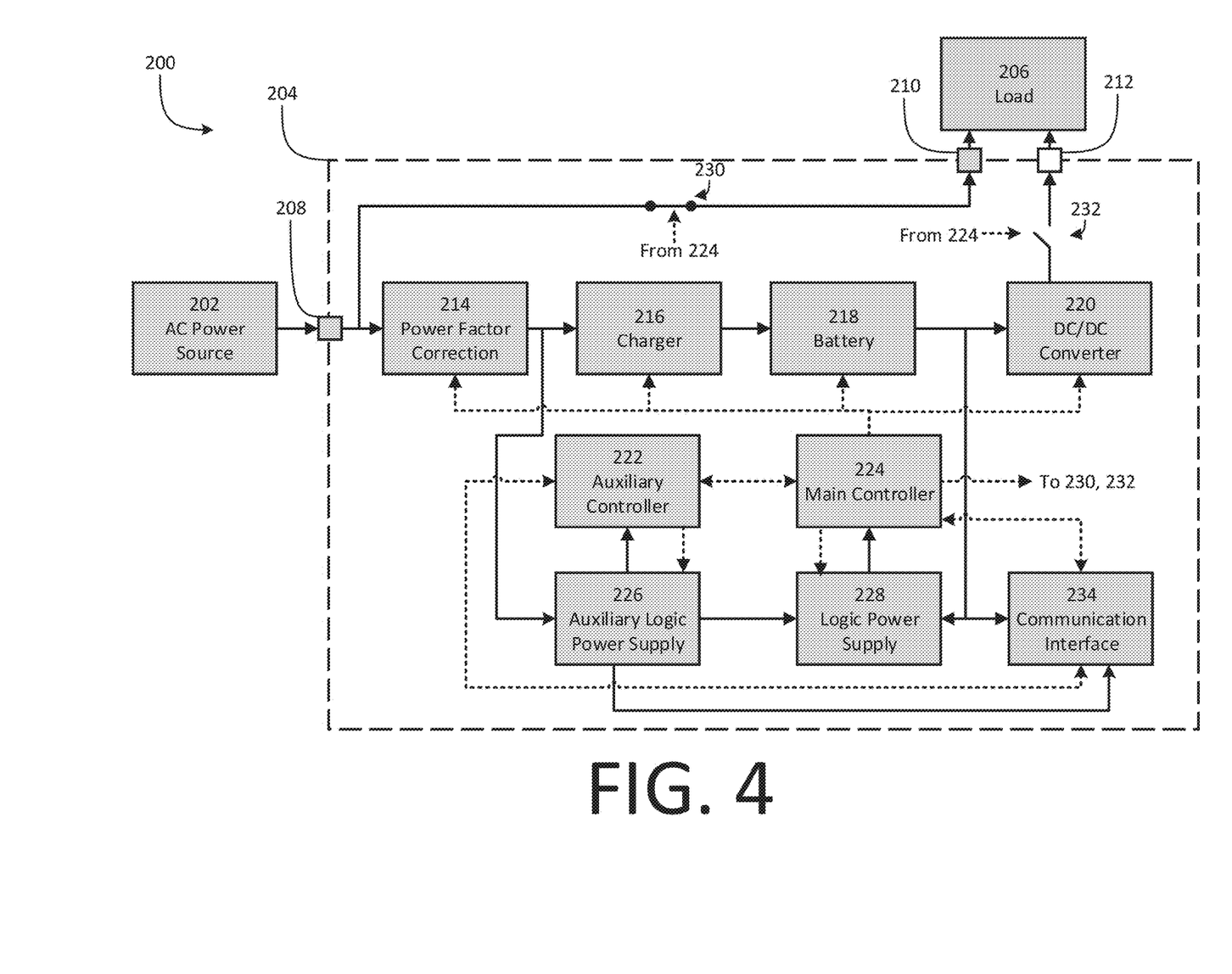
FIG. 4 illustrates a block diagram of the power system of FIG. 2 in a mains mode of operation according to an example.

At act 310, the UPS 204 is controlled to be in the mains mode of operation. In the mains mode of operation, the UPS 204 is configured to provide output AC power at the AC output 210 derived from the input 208. FIG. 4 illustrates a block diagram of the power system 200 where the UPS 204 is in the mains mode of operation according to an example, in which shaded components are active and non-shaded components are inactive. Inactive components may be in an off or low-power mode of operation in which a power consumption of the component is reduced relative to the active mode of operation.

As illustrated by FIG. 4, each of the components 214-228, 234 may be active in the mains mode of operation. The main controller 224 may control the AC output switch 230 to be in the closed and conducting position such that AC power received at the input 208 is available at the AC output 210. The main controller 224 may further control the DC output switch 232 to be in the open and non-conducting position such that DC power output by the DC/DC converter 220 is not available at the DC output 212.

The main controller 224 may further control the charger 216 to charge the battery 218 during the mains mode of operation. The main controller 224 may communicate with the battery 218 to determine whether to charge the battery 218 (for example, by polling the battery 218 for charge information and determining whether the charge level of the battery 218 is above or below a charge threshold). If the main controller 224 determines that the battery 218 is to be charged, the main controller 224 may control the charger 216 to charge the battery 218. Accordingly, in the mains mode of operation, the UPS 204 provides AC output power directly to the load 206 from the input 208 via the AC output 210, and may charge the battery 218 with power derived from the input 208. The process 300 continues to act 314. At act 314, the process 300 ends.

Figure 5:
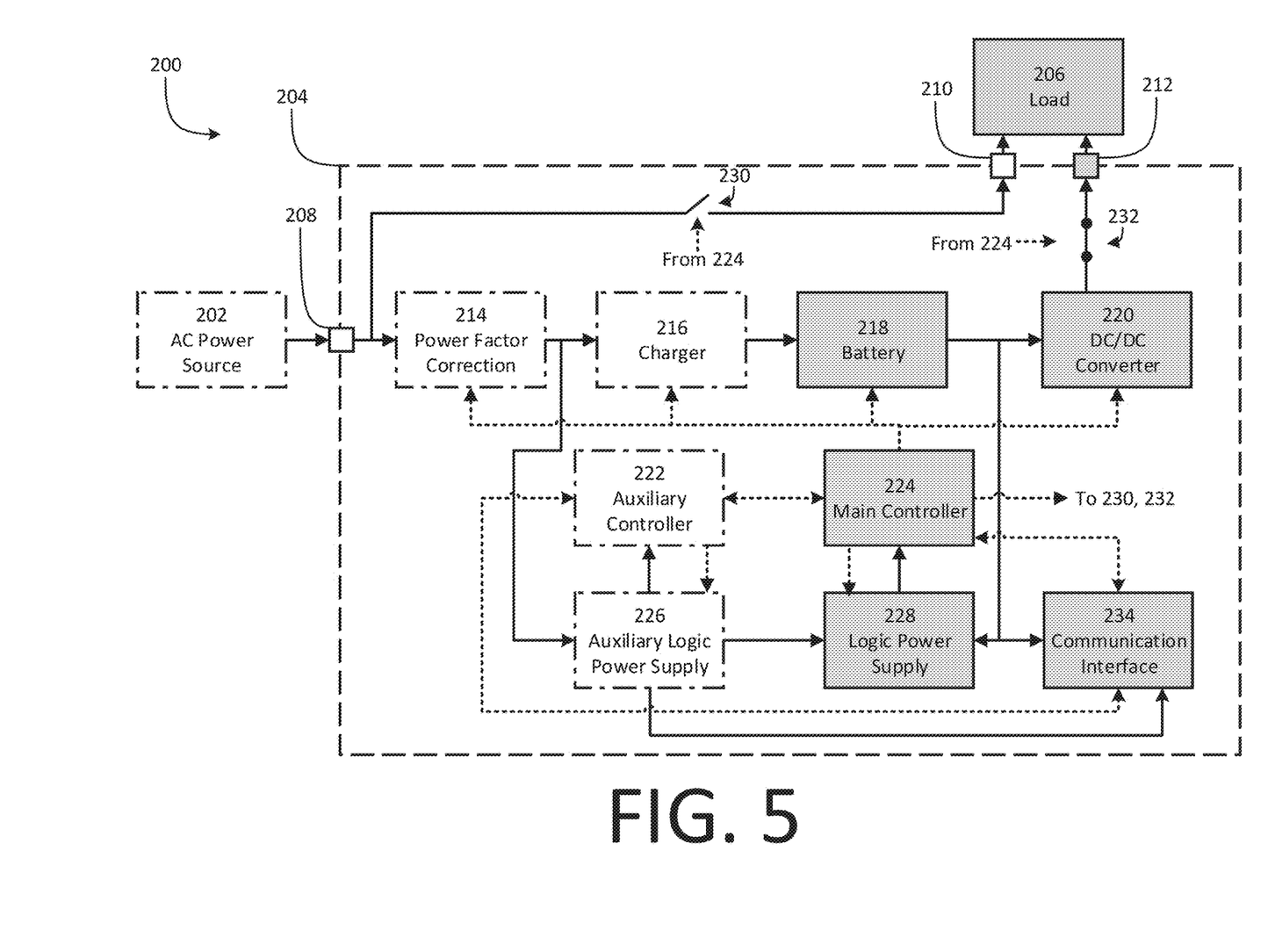
FIG. 5 illustrates a block diagram of the power system of FIG. 2 in a battery mode of operation according to an example.

Returning to act 308, if acceptable AC power is not available (308 NO), then the process 300 continues to act 312. At act 312, the UPS 204 is controlled to be in the battery mode of operation. In the battery mode of operation, the UPS 204 is configured to provide output DC power at the DC output 212 derived from the battery 218. FIG. 5 illustrates a block diagram of the power system 200 where the UPS 204 is in the battery mode of operation according to an example, in which shaded components are active and non-shaded components are inactive. Inactive components may be in an off or low-power mode of operation in which a power consumption of the component is reduced relative to the active mode of operation.

As illustrated by FIG. 5, the battery 218, DC/DC converter 220, main controller 224, LPS 228, and communication interface 234 may be active during the battery mode of operation. The main controller 224 may control the DC output switch 232 to be in the closed and conducting position such that DC power provided by the DC/DC converter 220 is available at the DC output 212. The main controller 224 may further control the AC output switch 230 to be in the open and non-conducting position such that the input 208 is disconnected from the AC output 210 in some examples. In other examples, the AC output switch 230 may be closed and conducting. Accordingly, in the battery mode of operation, the UPS 204 provides DC output power derived from the battery 218 to the DC output 212. The process 300 continues to act 314. At act 314, the process 300 ends.

Accordingly, the UPS 204 may execute the process 300 to determine a mode of operation in which to operate, including a charging mode of operation, a low-power mode of operation, a mains mode of operation, and a battery mode of operation. The UPS 204 may repeatedly execute the process 300 to repeatedly evaluate which mode of operation the UPS 204 should be in. That is, although the process 300 ends at act 318, the UPS 204 may re-execute the process 300 periodically or aperiodically after the process 300 ends. Furthermore, the UPS 204 may already be in a mode of operation arrived at in the process 300 when the process 300 is subsequently re-executed. For example, the UPS 204 may already be in the low-power mode when the UPS 204 subsequently re-executes the process 300, and again determine that the UPS 204 should remain in the low-power mode. The UPS 204 may thus continue executing the low-power mode, rather than re-initiating the low-power mode.

Figure 6:
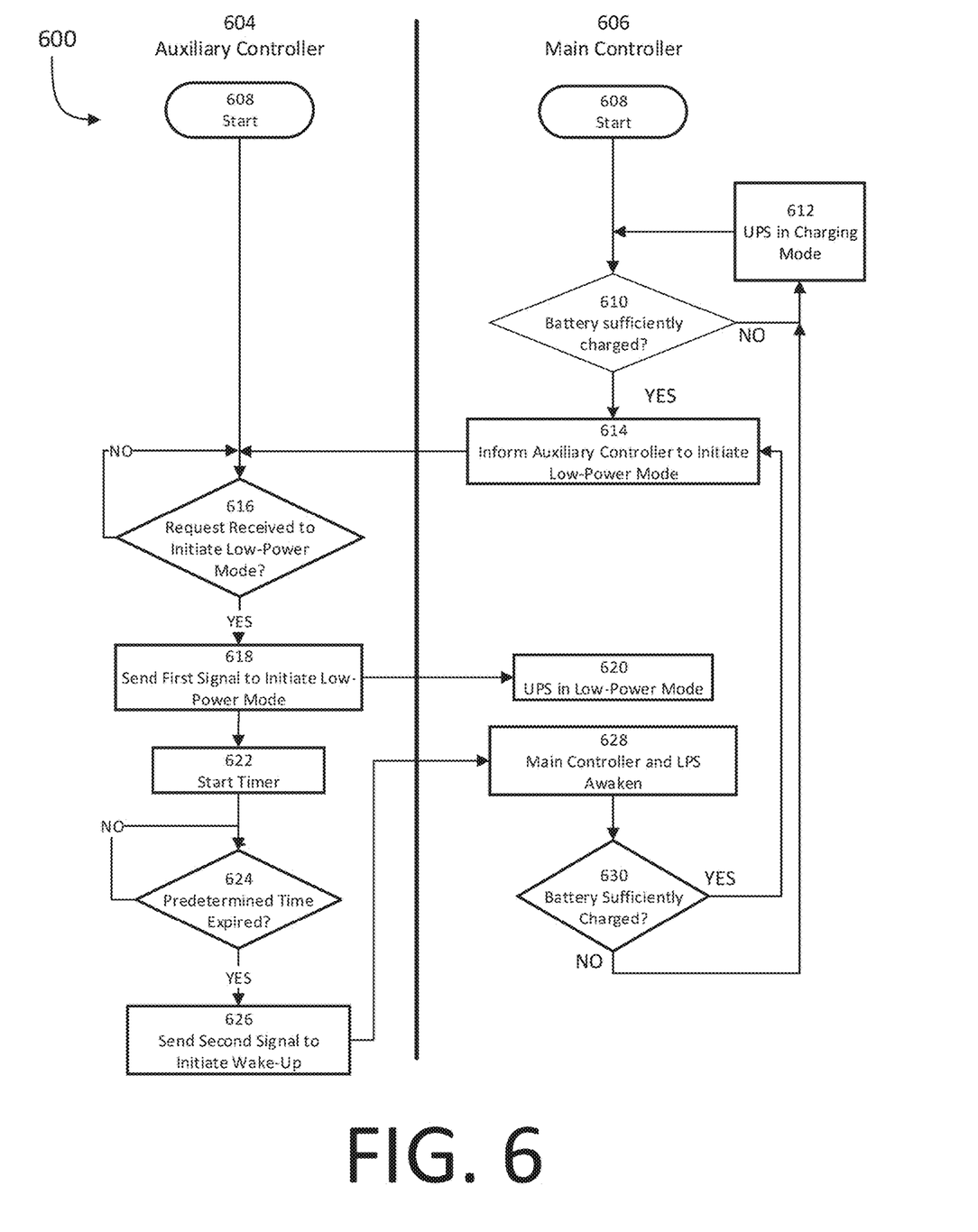
FIG. 6 illustrates a process of controlling a power device in an away mode according to an example.

As discussed above, at act 306, the UPS 204 is in the away mode, which includes a charging mode of operation and a low-power mode of operation. An example of act 306 is provided with respect to FIG. 6. FIG. 6 illustrates a process 600 of controlling a power device, such as the UPS 204, in the away mode according to an example. The process 600 may be executed by the auxiliary controller 222 and the main controller 224. Accordingly, the process 600 is illustrated as a swim-lane diagram in which acts in a left column 602 are performed by, or in connection with, the auxiliary controller 222, and acts in a right column 604 are performed by, or in connection with, the main controller 224. However, acts in the right column 604 may be executed in connection with other components of the UPS 204 in addition to the auxiliary controller 222, including the main controller 224, and acts in the left column 602 may be executed in connection with other components of the UPS 204 in addition to the main controller 224, including the auxiliary controller 222.

At act 608, the process 600 begins.

At act 610, the main controller 224 determines whether the battery 218 is sufficiently charged. For example, the main controller 224 may communicate with the battery 218 to determine a charge level of the battery 218, and determine whether the charge level of the battery 218 is above a charge threshold. In one example, the battery 218 may be considered sufficiently charged where the charge level of the battery 218 is greater than about 91% of a full charge (for example, a maximum charge that the battery 218 is presently capable of holding), greater than about 93% of a full charge, greater than about 95% of a full charge, greater than about 99% of a full charge, greater than about 93% to about 97% of a full charge, greater than about 91% to about 99% of a full charge, greater than about 85% to about 97% of a full charge, or greater than another value or within a range of values. In other examples, other thresholds may be implemented. In various examples, a threshold may vary over time. For example, the main controller 224 may determine a threshold to implement based on one or more factors such as number of discharge cycles, ambient temperature, an age of the battery 218, a user selection or preference, a degradation in a maximum charge capacity of the battery 218, and/or other factors. If the battery 218 is determined not to be sufficiently charged (610 NO), then the process 600 continues to act 612.

Figure 7:
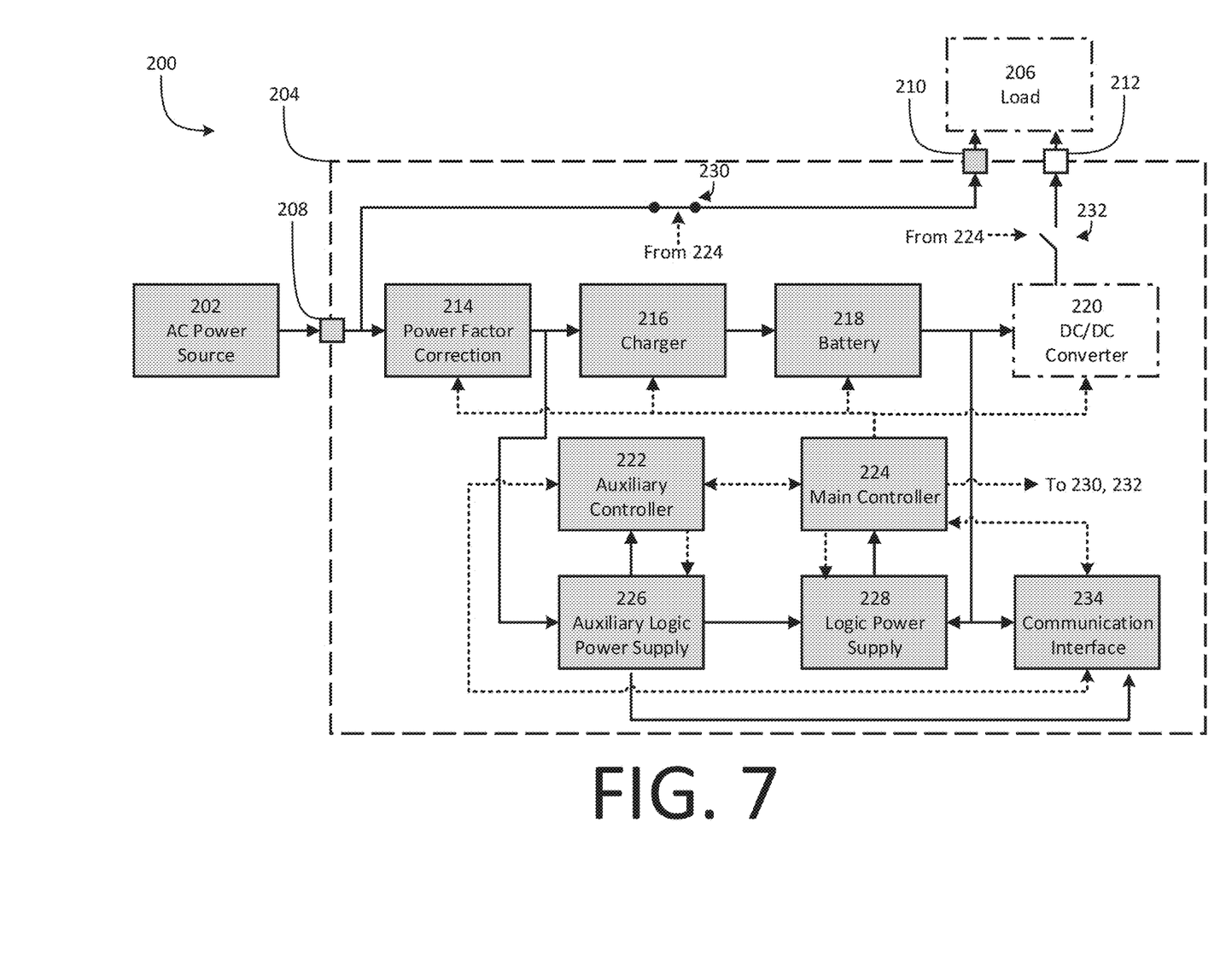
FIG. 7 illustrates a block diagram of the power system of FIG. 2 in a charging mode of operation according to an example.

At act 612, the UPS 204 is controlled to be in the charging mode of operation. In the charging mode of operation, the UPS 204 is configured to charge the battery 218 with power derived from the AC power source 202. FIG. 7 illustrates a block diagram of the power system 200 where the UPS 204 is in the charging mode of operation according to an example, in which shaded components are active and non-shaded components are inactive. Inactive components may be in an off or low-power mode of operation in which a power consumption of the component is reduced relative to the active mode of operation. As illustrated by FIG. 7, in the charging mode of operation, the PFC circuit 214, charger 216, battery 218, auxiliary controller 222, main controller 224, ALPS 226, LPS 228, and communication interface 234 are active, and the DC/DC converter 220 is inactive. For example, logic and control components of the DC/DC converter 220 may be turned off while the DC/DC converter 220 is inactive.

In the charging mode of operation, the AC power source 202 may provide AC power to the input 208. The PFC circuit 214 may draw AC power from the input 208, and provide power to the charger 216 and the ALPS 226. The charger 216 provides a charging current to the battery 218 to charge the battery 218. The battery 218 may provide power to the LPS 228. The ALPS 226 may provide power to the auxiliary controller 222 and, in some examples, to the LPS 228 in addition to, or in lieu of, the battery 218 providing power to the LPS 228. The LPS 228 may provide power to the main controller 224.

In some examples of the charging mode of operation, the main controller 224 may control the AC output switch 230 to be in a closed and conducting position such that AC power received at the input 208 is available at the AC output 210. However, as discussed above, the load 206 may not draw power from the UPS 204 in the charging mode of operation. For example, the load 206 may be disconnected from the UPS 204 or may be in an off mode of operation. Thus, although the AC output switch 230 may be in a closed and conducting position such that AC power is available at the AC output 210, the load 206 may not draw any power from the AC output 210. In other examples, the main controller 224 may control both the AC output switch 230 and the DC output switch 232 to be in an open and non-conducting position in the charging mode of operation.

While the UPS 204 is in the charging mode of operation, the process 600 returns to act 610. The main controller 224 again determines whether the battery 218 is sufficiently charged, such as by determining whether a charge level of the battery 218 is above a threshold level of charge. In some examples, the main controller 224 may implement hysteresis such that a first threshold level is used to initially enter the charging mode of operation, and a second threshold level (for example, a higher threshold level) is used when the UPS 204 is in the charging mode of operation and the process 600 continues from act 612 to act 610. For example, once in the charging mode of operation, the UPS 204 may not determine that the battery 218 is sufficiently charged (610 YES) until the battery 218 is about 99% charged, whereas a lower threshold may be implemented (for example, about 95%) when act 610 is initially executed. In other examples, the main controller 224 may not implement multiple thresholds. It is to be appreciated that particular threshold values are provided for purposes of explanation, and that different thresholds and/or ranges may be implemented in other examples, as discussed above.

Returning to act 610, if a determination is made that the battery 218 is sufficiently charged (610 YES), then the process 600 continues to act 614. At act 614, the main controller 224 informs the auxiliary controller 222 to initiate the low-power mode of operation.

At act 616, the auxiliary controller 222 determines whether a request has been received from the main controller 224 to initiate the low-power mode of operation. If a request has not been received (616 NO), then act 616 is repeated until a request has been received. In response to receiving the request from the main controller 224 sent at act 614, the auxiliary controller 222 determines that the request to initiate the low-power mode has been received (616 YES), and the process 600 continues to act 618.

At act 618, the auxiliary controller 222 sends a first signal to the main controller 224 to initiate the low-power mode of operation. The auxiliary controller 222 may further send the first signal to the LPS 228 to deactivate the LPS 228. In another example, the main controller 224 may deactivate the LPS 228 responsive to receive the first signal. The process 600 continues from act 618 to acts 620 and 622.

Figure 8:
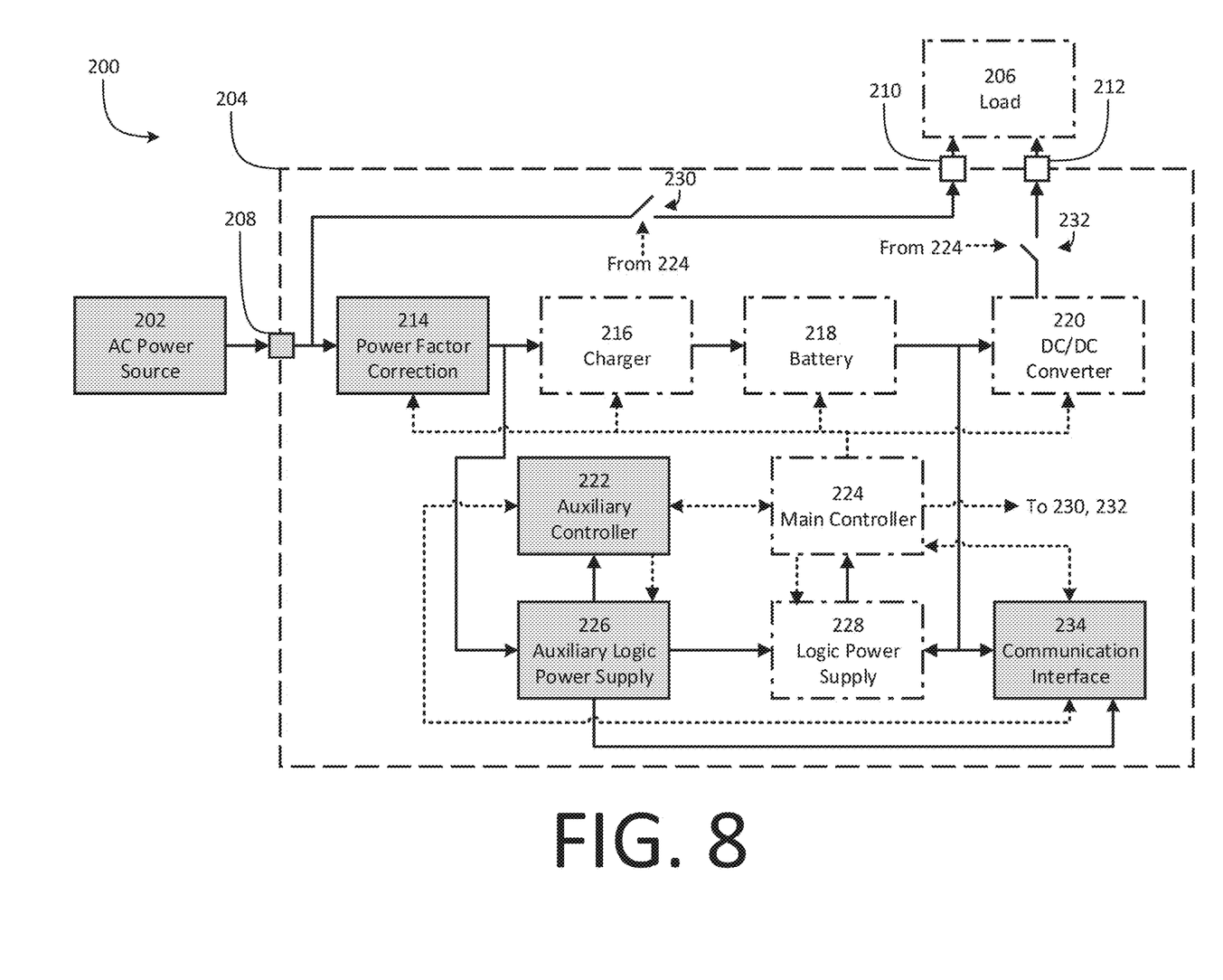
FIG. 8 illustrates a block diagram of the power system of FIG. 2 in a low-power mode of operation according to an example.

At act 620, the main controller 224 receives the first signal, and controls the UPS 204 to be in the low-power mode of operation. In the low-power mode of operation, several components of the UPS 204 are deactivated, thereby minimizing a power consumption of the UPS 204. For example, the main controller 224 may deactivate the several components. FIG. 8 illustrates a block diagram of the power system 200 where the UPS 204 is in the low-power mode of operation according to an example, in which shaded components are active and non-shaded components are inactive. Inactive components may be in an off or low-power mode of operation in which a power consumption of the component is reduced relative to the active mode of operation. As illustrated by FIG. 8, in the low-power mode of operation, the PFC circuit 214, auxiliary controller 222, the ALPS 226, and the communication interface 234 may be active in the low-power mode of operation, and the charger 216, battery 218, DC/DC converter 220, main controller 224, and LPS 228 may be inactive in the low-power mode of operation. For example, logic and control components of each of the inactive components may be controlled to be off in the inactive mode of operation. In alternate examples, additional, fewer, or different components may be inactive. For example, in some embodiments, one or more components of the communication interface 234 may be inactive during the low-power mode of operation.

In the low-power mode of operation, the AC power source 202 may provide AC power to the input 208. The PFC circuit 214 may draw AC power from the input 208, and provide power to the ALPS 226. The ALPS 226 may provide power to the auxiliary controller 222. In some examples, the AC output switch 230 and the DC output switch 232 may be in an open and non-conducting position. For example, the AC output switch 230 and the DC output switch 232 may be normally open switches, such that the switches 230, 232 remain open unless closed by the main controller 224. The main controller 224 may not close either of the switches 230, 232 while the main controller 224 is inactive.

In other examples, the main controller 224 may close one or both of the switches 230, 232 during the low-power mode of operation. In still other examples, the switches 230, 232 may be normally closed, or may be closed by a component other than the main controller 224. However, as discussed above, the load 206 may not draw power from the UPS 204 in the low-power mode of operation. For example, the load 206 may be disconnected from the UPS 204 or may be in an off mode of operation. Thus, in examples in which either or both of the switches 230, 232 is closed during the low-power mode of operation, the load 206 may not draw any power from the AC output 210 or the DC output 212.

At act 622, the auxiliary controller 222 starts a timer or otherwise determines a time at which the auxiliary controller 222 sent the first signal at act 618.

At act 624, the auxiliary controller 222 determines whether a predetermined time has expired since executing act 622. For example, the auxiliary controller 222 may determine whether the time indicated by a timer started at act 622 has elapsed. The predetermined time may be, for example, one hour, eight hours, 24 hours, or another length of time. If the predetermined time has not expired (624 NO), act 624 is repeated until a determination is made that the predetermined time has expired. If the predetermined time has expired (624 YES), then the process 600 continues to act 626.

At act 626, the auxiliary controller 222 sends a second signal to the main controller 224 to power-up the main controller 224. In some examples, the auxiliary controller 222 may also send the second signal to the LPS 228 to power-up the LPS 228. The ALPS 226 may provide power to the LPS 228 to power-up the LPS 228.

At act 628, the main controller 224 receives the second signal and awakens to an active mode. The LPS 228 may also be awakened to the active mode and provide power derived from either or both of the battery 218 and the ALPS 226. to the main controller 224.

At act 630, the main controller 224 determines whether the battery 218 is sufficiently charged. Act 630 may be similar to act 610. The main controller 224 may communicate with the battery 218 to determine a charge level of the battery 218, and may determine whether the charge level of the battery 218 is above or below a threshold level of charge. The threshold level of charge may be the same or different than a threshold level of charge implemented in connection with act 610.

If the main controller 224 determines that the battery 218 is not sufficiently charged (630 NO), then the process 600 continues to act 612. As discussed above, at act 612, the UPS 204 is in the charging mode of operation to charge the battery 218. Acts 610 and 612 are repeated until a determination is made that the battery 218 is sufficiently charged (610 YES), and the process 600 continues to act 614.

Otherwise, if the main controller 224 determines that the battery 218 is sufficiently charged (630 YES), then the process 600 continues to act 614. At act 614, the main controller 224 again informs the auxiliary controller 222 to initiate the low-power mode of operation, and the process 600 repeats as discussed above.

Accordingly, the UPS 204 may enter the away mode at act 306 in response to receiving the away-mode signal at act 304. In the away mode, the process 600 is executed. If the battery 218 is sufficiently charged, then the UPS 204 may be controlled to be in the low-power mode of operation. In the low-power mode of operation, the charger 216, battery 218, DC/DC converter 220, main controller 224, and LPS 228 may be deactivated. Power consumption by the UPS 204 may be reduced by deactivating the components 216-220, 224, and 228. As discussed above, in some examples, the communication interface 234 may also be deactivated.

In the low-power mode of operation, the auxiliary controller 222 may awaken components of the UPS 204, including the main controller 224, after a predetermined period of time. After being awakened, the main controller 224 determines whether the charging mode of operation is to be initiated, for example, if a charge level of the battery 218 is below a threshold level. If the charging mode of operation is not to be initiated, then the components of the UPS 204 previously awoken by the auxiliary controller 222, including the main controller 224, are again deactivated for the threshold period of time. Thus, the power consumption of the UPS 204 is reduced while the UPS 204 repeatedly evaluates the battery 218 to determine whether the battery 218 is to be charged.

In various examples, the process 600 may be executed until an interrupt condition is satisfied. For example, if the UPS 204 exits the away mode, the process 600 may be terminated and the UPS 204 may execute the process 300 to determine a mode of operation to be in. The UPS 204 may exit the away mode in response to the away-mode signal being de-asserted, for example, or receiving another signal via the communication interface 234 requesting that the UPS 204 exit the away mode of operation.

It is to be appreciated that modifications to the power system 200 are within the scope of the disclosure. In some examples, the communication interface 234 may be electrically coupled to, and receive power from, the ALPS 226 in addition to, or in lieu of, other components such as the battery 218. In other examples, the communication interface 234 may not be electrically coupled to, or receive power from, the ALPS 226. Some, none, or all of the components of the communication interface 234 may receive power from the ALPS 226 and remain active and operational during one or more modes of operation of the power system 200, including the low-power mode of operation. For example, one or more components of the communication interface 234 that enable an instruction or request to exit the low-power mode to be provided to the power system 200 may be powered by the ALPS 226 in the low-power mode of operation. In other examples, one or more components of the communication interface 234 may receive power from one or more other components in addition to, or in lieu of, the ALPS 226 during the low-power mode of operation. In still other examples, the communication interface 234 may remain unpowered during the low-power mode of operation.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An uninterruptible power supply comprising:
    an input configured to be coupled to a power source;
    an output configured to output power to a load;
    a main controller;
    a main logic power supply; and
    an auxiliary controller configured to:
        receive a first signal indicating that the load is not powered by the uninterruptible power supply,
        output a second signal to initiate a low-power mode of the uninterruptible power supply responsive to receiving the first signal, wherein the low-power mode includes shutting down the main controller and the main logic power supply, and
        output a third signal to exit the low-power mode, wherein exiting the low-power mode includes causing the main controller and the main logic power supply to be powered up.

2. The uninterruptible power supply of claim 1, further comprising a battery charger configured to charge at least one battery, wherein the main controller is further configured to:
    determine whether a charge level of the at least one battery is above a threshold level of charge responsive to determining that the load is not powered by the uninterruptible power supply; and
    provide the first signal to the auxiliary controller responsive to determining that the charge level of the at least one battery is above the threshold level of charge.

3. The uninterruptible power supply of claim 2, wherein the auxiliary controller is configured to provide the second signal to the main controller, and wherein the main controller is configured to shut down responsive to receiving the second signal.

4. The uninterruptible power supply of claim 3, further comprising a DC/DC converter, wherein the main controller shutting down includes controlling the DC/DC converter to shut down.

5. The uninterruptible power supply of claim 2, wherein the threshold level of charge is approximately 95% of a maximum capacity of the at least one battery.

6. The uninterruptible power supply of claim 2, wherein the auxiliary controller is configured to output the third signal to the main controller to power up the main controller.

7. The uninterruptible power supply of claim 2, further comprising an auxiliary logic power supply, wherein the auxiliary logic power supply is configured to:
    receive power from the input; and
    provide power to the auxiliary controller using the power from the input.

8. The uninterruptible power supply of claim 7, wherein the auxiliary logic power supply is configured to provide power to the main logic power supply using the power from the input.

9. The uninterruptible power supply of claim 2, wherein the main controller is further configured to:
    control the battery charger to provide power from the input to the at least one battery responsive to determining that the charge level of the at least one battery is below the threshold level of charge.

10. The uninterruptible power supply of claim 2, wherein the main controller is further configured to:
    determine whether the charge level of the at least one battery is above the threshold level of charge responsive to receiving the third signal from the auxiliary controller; and
    provide a fourth signal to the auxiliary controller responsive to determining that the charge level of the at least one battery is above the threshold level of charge.

11. The uninterruptible power supply of claim 10, wherein the auxiliary controller is further configured to output a fifth signal to the main controller to initiate the low-power mode of the uninterruptible power supply responsive to receiving the fourth signal.

12. A method of controlling an uninterruptible power supply having an input configured to be coupled to a power source, an output configured to output power to a load, a main controller, a main logic power supply, and an auxiliary controller, the method comprising:
    receiving, by the auxiliary controller, a first signal indicating that the load is not powered by the uninterruptible power supply;
    outputting, by the auxiliary controller, a second signal to initiate a low-power mode of the uninterruptible power supply responsive to receiving the first signal, wherein the low-power mode includes shutting down the main controller and the main logic power supply; and
    outputting, by the auxiliary controller, a third signal to exit the low-power mode, wherein exiting the low-power mode includes causing the main controller and the main logic power supply to be powered up.

13. The method of claim 12, wherein the uninterruptible power supply includes a battery charger configured to charge at least one battery, the method further comprising:
    determining, by the main controller, whether a charge level of the at least one battery is above a threshold level of charge responsive to determining that the load is not powered by the uninterruptible power supply; and
    providing, by the main controller, the first signal to the auxiliary controller responsive to determining that the charge level of the at least one battery is above the threshold level of charge.

14. The method of claim 13, wherein the uninterruptible power supply further includes a DC/DC converter, and wherein shutting down the main controller includes controlling the DC/DC converter to shut down.

15. The method of claim 13, wherein outputting the third signal to the main controller includes powering up the main controller.

16. The method of claim 13, wherein the method further includes:
    controlling, by the main controller, the battery charger to provide power from the input to the at least one battery responsive to determining that the charge level of the at least one battery is below the threshold level of charge.

17. The method of claim 13, wherein the method further includes:
    determining, by the main controller, whether the charge level of the at least one battery is above the threshold level of charge responsive to receiving the third signal from the auxiliary controller; and
    providing, by the main controller, a fourth signal to the auxiliary controller responsive to determining that the charge level of the at least one battery is above the threshold level of charge.

18. The method of claim 17, further comprising outputting, by the auxiliary controller, a fifth signal to the main controller to initiate the low-power mode of the uninterruptible power supply responsive to receiving the fourth signal.

19. The method of claim 13, further comprising providing, by the auxiliary logic power supply, power to the main logic power supply using the power from the input.

20. A non-transitory computer-readable medium storing thereon sequences of computer-executable instructions for controlling an uninterruptible power supply configured to provide power to a load, the uninterruptible power supply comprising a main controller and a main logic power supply configured to provide power to the main controller, the sequences of computer-executable instructions including instructions that instruct at least one processor to:
    receive a first signal indicating that the load is not powered by the uninterruptible power supply;
    output a second signal to initiate a low-power mode of the uninterruptible power supply responsive to receiving the first signal, wherein the low-power mode includes shutting down the main controller and the main logic power supply; and
    output a third signal to exit the low-power mode, wherein exiting the low-power mode includes causing the main controller and the main logic power supply to be powered up.

* * * * *